US009625189B2

(12) United States Patent
Tsubouchi

(10) Patent No.: US 9,625,189 B2
(45) Date of Patent: Apr. 18, 2017

(54) ABSORPTION TYPE HEAT PUMP DEVICE

(71) Applicant: AISIN SEIKI KABUSHIKI KAISHA, Kariya-shi (JP)

(72) Inventor: Osamu Tsubouchi, Chiryu (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 677 days.

(21) Appl. No.: 13/873,697

(22) Filed: Apr. 30, 2013

(65) Prior Publication Data

US 2013/0319028 A1 Dec. 5, 2013

(30) Foreign Application Priority Data

May 31, 2012 (JP) ................................. 2012-124218

(51) Int. Cl.
*F25B 30/04* (2006.01)
*F25B 15/02* (2006.01)
(Continued)

(52) U.S. Cl.
CPC ......... *F25B 30/04* (2013.01); *B60H 1/00278* (2013.01); *B60H 1/3201* (2013.01);
(Continued)

(58) Field of Classification Search
CPC ........ F25B 30/04; F25B 29/006; F25B 15/06; B60H 1/3201; B60H 1/00278; Y02B 30/62
(Continued)

(56) References Cited

U.S. PATENT DOCUMENTS 5,181,387 A * 1/1993 Meckler .................. F02G 1/043
62/176.1
7,059,147 B2 6/2006 Inoue
(Continued)

FOREIGN PATENT DOCUMENTS

DE 10 2009 019 944 A1 11/2009
JP 53-113353 A 10/1978
(Continued)

OTHER PUBLICATIONS

English translation of JP 2011-2222000, Nov. 4, 2011—note that the orginal foreign patent was cited on applicants IDS dated Apr. 30, 2013.*

(Continued)

*Primary Examiner* — Jianying Atkisson
*Assistant Examiner* — Joel Attey
(74) *Attorney, Agent, or Firm* — Buchanan Ingersoll & Rooney PC

(57) ABSTRACT

Provided is an absorption type heat pump device including: a battery, a battery case, a regenerator, a condenser, an evaporator, an absorber, and a controller, in which, in the cooling operation, heat exchange between the absorber and the outside of the absorber is performed, the refrigerant having a liquid phase is supplied to the battery case from the condenser, and the refrigerant having a gas phase which is obtained by evaporating the refrigerant having a liquid phase by the heat of the battery, is supplied to the absorber, and in the heating operation, heat exchange between the absorber and the battery case is performed, the refrigerant having a gas phase or a liquid phase is supplied to the absorber from the evaporator, and the absorbing solution with relatively high concentration which is accommodated in the regenerator is supplied to the absorber.

6 Claims, 6 Drawing Sheets

(51) Int. Cl.
  *B60H 1/00* (2006.01)
  *B60H 1/32* (2006.01)
  *F25B 29/00* (2006.01)
  *F25B 15/06* (2006.01)

(52) U.S. Cl.
  CPC .............. *F25B 15/02* (2013.01); *F25B 15/06* (2013.01); *F25B 29/006* (2013.01); *Y02B 30/62* (2013.01)

(58) Field of Classification Search
  USPC .................................. 62/238.2, 238.1, 238.7
  See application file for complete search history.

(56) References Cited

U.S. PATENT DOCUMENTS

| | | | |
|---|---|---|---|
| 2002/0108390 A1* | 8/2002 | Ichikawa | F25B 15/02 62/324.2 |
| 2009/0280395 A1 | 11/2009 | Nemesh et al. | |
| 2011/0005267 A1* | 1/2011 | Lambert | B60H 1/32 62/476 |
| 2011/0020676 A1 | 1/2011 | Kurosawa | |
| 2011/0120157 A1* | 5/2011 | Wohlert | F25B 15/02 62/101 |
| 2012/0031131 A1 | 2/2012 | Danov et al. | |
| 2013/0118707 A1 | 5/2013 | Kardos et al. | |

FOREIGN PATENT DOCUMENTS

| | | |
|---|---|---|
| JP | 64-070661 A | 3/1989 |
| JP | 07-105988 A | 4/1995 |
| JP | 2004-131034 A | 4/2004 |
| JP | 20070223570 A | 9/2007 |
| JP | 2009-259785 A | 11/2009 |
| JP | 2011-222200 A | 11/2011 |
| WO | 2012021104 A1 | 2/2012 |

OTHER PUBLICATIONS

Extended European Search Report issued on Oct. 8, 2015, by the European Patent Office in corresponding European Patent Application No. 13169811.0-1605 (5 pages).

Office Action issued on Jan. 26, 2016, by the Japanese Patent Office in corresponding Japanese Patent Application No. 2012-124218, and an English Translation of the Office Action. (6 pages).

* cited by examiner

ABSORPTION TYPE HEAT PUMP DEVICE

CROSS REFERENCE TO RELATED APPLICATIONS

This application is based on and claims priority under 35 U.S.C. §119 to Japanese Patent Application 2012-124218, filed on May 31, 2012, the entire content of which is incorporated herein by reference.

TECHNICAL FIELD

This disclosure relates to an absorption type heat pump device.

BACKGROUND DISCUSSION

Recently, a device which cools a battery (secondary battery) mounted on a vehicle, for example, has been developed. JP 2011-222200A (Reference 1) discloses a device which cools a battery using a sorbent. In addition, JP2004-131034A (Reference 2) discloses a device which cools a battery using an ejector.

However, in the device of Reference 1, a problem occurred in that cooling is stopped if absorption by the sorbent ends and the cooling is difficult at the time of regeneration of sorbent. In addition, since the sorbent is cooled for recovering an exhaust energy of an engine having a high temperature in a vehicle, a separated heat storage medium with high-temperature resistance is necessary, and thus, the structure becomes complicated.

In addition, in the device disclosed in Reference 2, a vapor generation amount to be used in the ejector changes depending on an operation state of an engine. Accordingly, at the time of idling stop, or in a case of fluctuation of a load of the engine, there is a concern in that cooling capacity is fluctuated and it is difficult to continuously exhibit necessary cooling performance.

In addition, there is a concern in that a battery is difficult to exhibit good performance in a case of a low temperature, thus, it is necessary to heat the battery at the start of the car.

A need thus exists for an absorption type heat pump device which is not susceptible to the drawback mentioned above.

SUMMARY

In order to solve the above-described problem, according to an aspect of this disclosure, there is provided an absorption type heat pump device including:
a battery;
a battery case which accommodates the battery;
a regenerator which separates a refrigerant having a gas phase from an absorbing solution heated by a heat source to relatively increase concentration of the absorbing solution;
a condenser which condenses the refrigerant having a gas phase obtained in the regenerator to obtain the solvent having a liquid phase, by performing heat exchange with the outside;
an evaporator which evaporates the refrigerant having a liquid phase obtained in the condenser to obtain the refrigerant having a gas phase, by performing heat exchange with the outside;
an absorber which causes the absorbing solution to absorb the refrigerant to obtain the relatively diluted absorbing solution, and supplies the diluted absorbing solution to the regenerator, by performing heat exchange with the outside or the battery case and bringing the absorbing solution having a liquid phase obtained in the regenerator in contact with the refrigerant having a gas phase; and
a controller which switches a cooling operation for cooling the battery and a heating operation for heating the battery,
in which, in the cooling operation, heat exchange between the absorber and the outside of the absorber is performed, the refrigerant having a liquid phase is supplied to the battery case from the condenser, and the refrigerant having a gas phase which is obtained by evaporating the refrigerant having a liquid phase by the heat of the battery, is supplied to the absorber, and
in the heating operation, heat exchange between the absorber and the battery case is performed, the refrigerant having a gas phase or a liquid phase is supplied to the absorber from the evaporator, and the absorbing solution with relatively high concentration which is accommodated in the regenerator is supplied to the absorber.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Next, this disclosure will be explained in more detail with reference to embodiments disclosed here and the attached drawings. An absorption type heat pump device of the embodiment is mounted on a hybrid car. In addition, the drawings are conceptual views for explaining a configuration.

Figure 1:
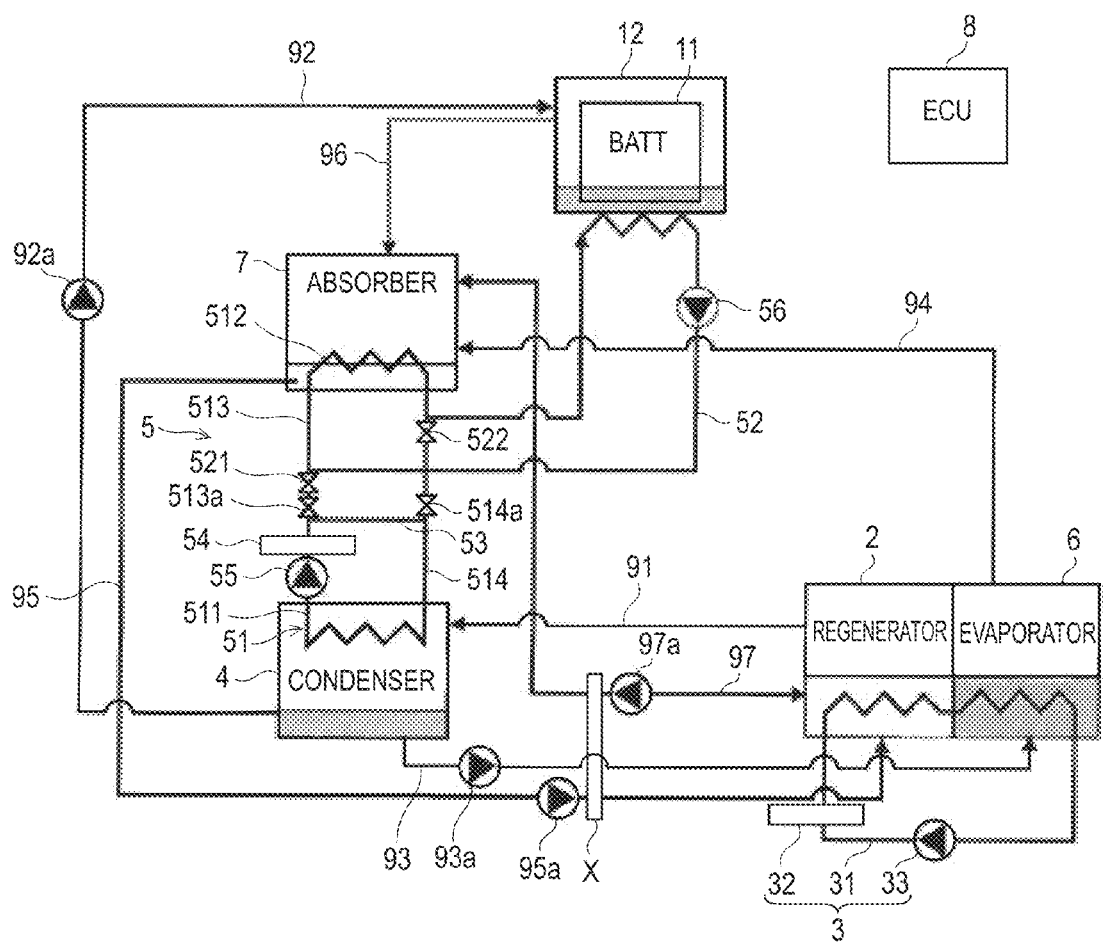
FIG. 1 is a conceptual view showing a configuration of an absorption type heat pump device of the embodiment disclosed here.

As shown in FIG. 1, the absorption type heat pump device of the embodiment mainly includes a battery 11, a battery case 12, a regenerator 2, a heat source 3, a condenser 4, a heat exchanger 5, an evaporator 6, an absorber 7, a controller 8, and flow paths 91 to 98.

The battery 11 is a battery for a vehicle, and is accommodated in the battery case 12. The battery case 12 accommodates the battery 11 therein, and atmosphere pressure inside thereof is set to be relatively low (in the embodiment, about 1 kPa).

The regenerator 2 is a device which separates a refrigerant (diluent) having a gas phase from an absorbing solution which is heated by the heat source 3 to relatively increase concentration of the absorbing solution. The refrigerant of the embodiment is water. In detail, a heat exchange flow path 31 of the heat source 3 disposed in the regenerator 2 heats the absorbing solution accommodated in the regenerator 2 to generate vapor. As the absorbing solution, a solution obtained by dissolving halogen and alkali metal compound to a solvent can be used. For example, a lithium bromide aqueous solution and a lithium iodide aqueous solution, and a mixed solution thereof are exemplified, for the absorbing solution. The atmosphere pressure in the regenerator 2 is relatively high (in the embodiment, about 10 kPa).

The vapor obtained in the regenerator 2 is supplied to the condenser 4 through a first flow path 91, and the absorbing solution having relatively high concentration obtained in the regenerator 2 is supplied to the absorber 7 through a seventh flow path 97. An electric pump 97a is disposed on the seventh flow path 97.

The heat source 3 is a heat exchanger having heat generated in a vehicle as a heat source, and includes a heat exchange flow path 31 through which a heat medium flows, a heat exchange member 32 which performs heat exchange of exhaust gas of an engine (not shown) mounted on a vehicle and the heat medium in the heat exchange flow path 31, and an electric pump 33.

The heat exchange flow path 31 is a metal pipe, and is disposed over the inside of the regenerator 2, the inside of the evaporator 5, and the outside the regenerator 2 and the evaporator 5, and at the outside thereof, the heat exchange flow path is connected to the heat exchange member 32 and the electric pump 33. If the electric pump 33 is operated, the heat medium (heat exchange medium) flows through the inside of the heat exchange flow path 31, and is heated with the heat exchange member 32, and is cooled in the regenerator 2. That is, the absorbing solution in the regenerator 2 is heated by the heat exchange flow path 31 to discharge the vapor, and becomes the absorbing solution having higher concentration than that of the absorber 6. Accordingly, the regenerator 2 obtains the absorbing solution with relatively high concentration.

The condenser 4 is a device which condenses the vapor obtained in the regenerator 2 to obtain water (condensed solution), by performing heat exchange with the outside by the heat exchanger 5. The condenser 4 and the regenerator 2 are communicated with each other by the first flow path 91. The vapor flows into the condenser 4 from the regenerator 2 through the first flow path 91. A second flow path 92 which is connected to the battery case 12, and a third flow path 93 which is connected to the evaporator 6 are connected to the condenser 4. The water obtained in the condenser 4 flows into the battery case 12 through the second flow path 92 at the time of a cooling operation which will be described later, and flows into the evaporator 6 through the third flow path 93 at the time of a heating operation which will be described later. An electric pump 93a is installed in the third flow path 93. The atmosphere pressure in the condenser 4 is relatively high (in the embodiment, about 10 kPa).

The heat exchanger 5 (which corresponds to a "first heat exchanger" and a "second heat exchanger") includes an annular flow path 51, a first branched flow path 52, a second branched flow path 53, a heat exchange member 54, and electric pumps 55 and 56. The annular flow path 51 is an annular refrigerant flow path (metal pipe) which is commonly provided on the condenser 4 and the absorber 7.

Figure 2:
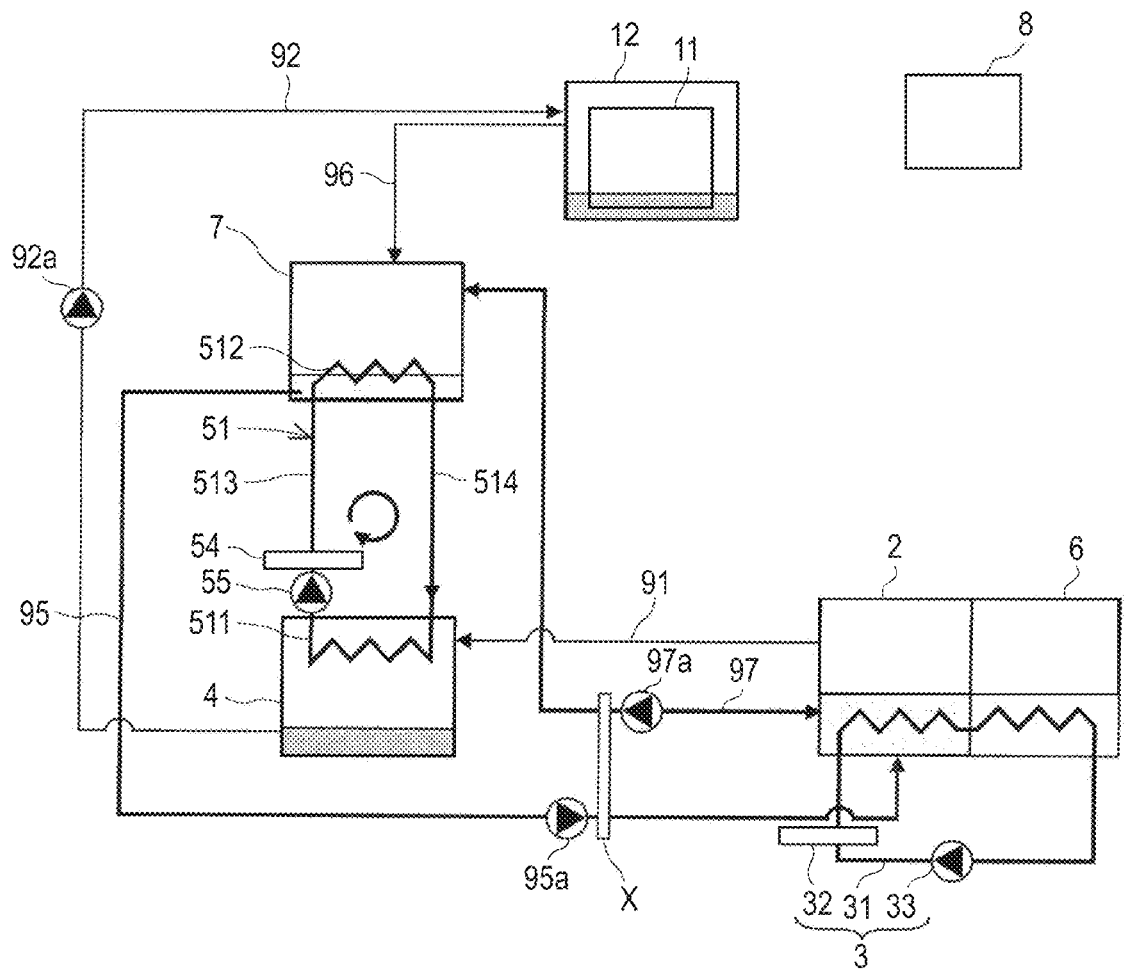
FIG. 2 is a conceptual view for explaining a cooling operation of the absorption type heat pump device of the embodiment.

As shown in FIGS. 1 and 2, the annular flow path 51 includes a first inner flow path 511 which is disposed in the condenser 4, a second inner flow path 512 which is disposed in the absorber 7, a first external flow path 513 which connects one end of the first inner flow path 511 and one end of the second inner flow path 512, and a second external flow path 514 which connects the other end of the first inner flow path 511 and the other end of the second inner flow path 512. The heat exchange member 54 and the electric pump 55 are provided in the first external flow path 513. If the electric pump 55 is operated, the refrigerant which is a heat medium in the annular flow path 51 flows through the inside of the annular flow path 51, is cooled in the heat exchange member 54, and is heated in the condenser 4 and the absorber 7.

In addition, the second inner flow path 512, a part of the first external flow path 513 on the absorber 7 side, and a part of the second external flow path 514 on the absorber 7 side correspond to a "common flow path". In addition, the remaining other part of the first external flow path 513 and the remaining other part of the second external flow path 514 except the common flow path correspond to a "cooling flow path".

The first branched flow path 52 (which corresponds to a "heating flow path") is a refrigerant flow path (metal pipe) which is branched from the annular flow path 51, and is joined to the annular flow path 51 through the battery case 12. In the annular flow path 51, the first branched flow path 52 is branched from a portion closer to the absorber 7, than the disposed position of the heat exchange member 54 and the electric pump 55. In detail, one end of the first branched flow path 52 is connected to the first external flow path 513 on the absorber 7 side with respect to the heat exchange member 54 and the electric pump 55, and the other end of the first branched flow path 52 is connected to the second external flow path 514.

A part of the first branched flow path 52 is fixed to an external surface of the battery case 12. The first branched flow path 52 is disposed so that the refrigerant which flows through the flow path and the battery case 12 (and the inside of the battery case 12) are subjected to heat exchange. Flow path change valves 521 and 522 are provided in both branched positions (connection positions) with the annular flow path 51, and the flow path through which the refrigerant flows, is controlled by the flow path change valves 521 and 522.

By the flow path change valves 521 and 522, a flow path A (see FIG. 3) configured with the second internal flow path 512, a part of the first external flow path 513 on the absorber 7 side, the first branched flow path 52, and a part of the second external flow path 514 on the absorber 7 side, and the annular flow path 51 are switched to each other.

In the annular flow path 51, the second branched flow path 53 is disposed on a closer side to the condenser 4 than the branched position of the first branched flow path 52. In detail, one end of the second branched flow path 53 is connected to the first external flow path 513 on the absorber 7 side with respect to the heat exchange member 54 and the electric pump 55 and on the condenser 4 side with respect to the branched position of the first branched flow path 52, and the other end of the second branched flow path 53 is connected to the second external flow path 514 on the condenser 4 side with respect to the branched position of the first branched flow path 52.

A flow path change valve 513a is provided in the connection position of the first external flow path 513 and the second branched flow path 53, and a flow path change valve 514a is provided in the connection position of the second external flow path 514 and the second branched flow path 53. By controlling the flow path change valves 513a and 514a, a flow path B (see FIG. 3) configured with the first internal flow path 511, a part of the first external flow path 513 on the condenser 4 side, a part of the second external flow path 514 on the condenser 4 side, and the second branched flow path 53, and the annular flow path 51 are switched to each other.

In a case of being switched to the flow path A by the flow path change valves 521 and 522 and being switched to the flow path B by the flow path change valves 513a and 514a, the heat exchanger 5 configures a refrigerant flow path independently with respect to the condenser 4 and the absorber 7, and configures a refrigerant flow path for heating the battery 11.

On the other hand, in a case where a flow path of the refrigerant is switched to the annular flow path 51 by the flow path change valves 521, 522, 513a, and 514a, the heat exchanger 5 configures a refrigerant flow path with the annular flow path 51 which is common for the condenser 4 and the absorber 7. In this case, heat exchange between the battery 11 and the absorber 7 is not performed. That is, the battery 11 is not heated and is cooled by evaporation of the supplied water.

The evaporator 6 is a device which evaporates the water obtained in the condenser 4 to obtain vapor, by performing heat exchange with the outside. The heat exchange flow path 31 is disposed in the evaporator 6, and the heat medium which flows into the heat exchange flow path 31 and the inside of the evaporator 6 are subjected to heat exchange. The vapor obtained in the evaporator 6 is supplied to the absorber 7 through a fourth flow path 94. The atmosphere pressure in the evaporator 6 is relatively low (in the embodiment, about 1 kPa).

The absorber 7 is a device which causes the absorbing solution to absorb the vapor (water) to obtain the relatively diluted absorbing solution by performing heat exchange with the outside or the battery case 12, and bringing the absorbing solution supplied from the regenerator 2 in contact with the vapor supplied from the battery case 12 or the evaporator 6. The absorber 7 supplies the obtained absorbing solution which is diluted to the regenerator 2 through a fifth flow path 95. An electric pump 95a is disposed on the fifth flow path 95. The absorber 7 and the battery case 12 are communicated with each other by a sixth flow path 96, and the vapor obtained in the battery case 12 is supplied to the absorber 7 through the sixth flow path 96.

Heat is generated in the absorber 7 by a reaction of the absorbing solution and the vapor, and a temperature in the absorber 7 becomes high. The second internal flow path 512 of the heat exchanger 5 is disposed in the absorber 7, and heat exchange of the inside of the absorber 7 and the outside of the absorber 7 or the battery case 12 is performed. Accordingly the inside of the absorber 7 is cooled. The atmosphere pressure in the absorber 7 is set to be relatively low (in the embodiment, about 1 kPa). Although will be described later, through the heat exchanger 5, the absorber 7 and the outside of the absorber 7 are subjected to heat exchange at the time of the cooling operation, and the absorber 7 and the battery case 12 are subjected to heat exchange at the time of the heating operation.

The controller 8 is an electronic control unit (ECU), and is a device which switches the cooling operation for cooling the battery 11 and the heating operation for heating the battery 11, based on various information items. The information items are a temperature of the battery 11, an operation state of the battery 11, an operation state of the mounted vehicle, a temperature of external air, and the like. The controller 8 controls the flow path change valves 521, 522, 513a, and 514a or the electric pumps 56, 92a, and 93a, according to the selected operation.

As shown in FIG. 2, in the cooling operation, the controller 8 controls the flow path change valves 521, 522, 513a, and 514a and configures the refrigerant flow path of the heat exchanger 5 with the annular flow path 51. Accordingly, heat exchange between the absorber 7 and the outside of the absorber 7 is performed. In addition, in the cooling operation, the controller 8 drives the electric pump 92a provided on the second flow path 92. Accordingly, the water (condensed solution) is supplied to the battery case 12 from the condenser 4. In the cooling operation, the water supplied to the battery case 12 is evaporated by the heat of the battery 11, and the vapor obtained herein is supplied to the absorber 7 through the sixth flow path 96. At the time of the cooling operation, the controller 8 stops the electric pumps 56 and 93a.

Figure 3:
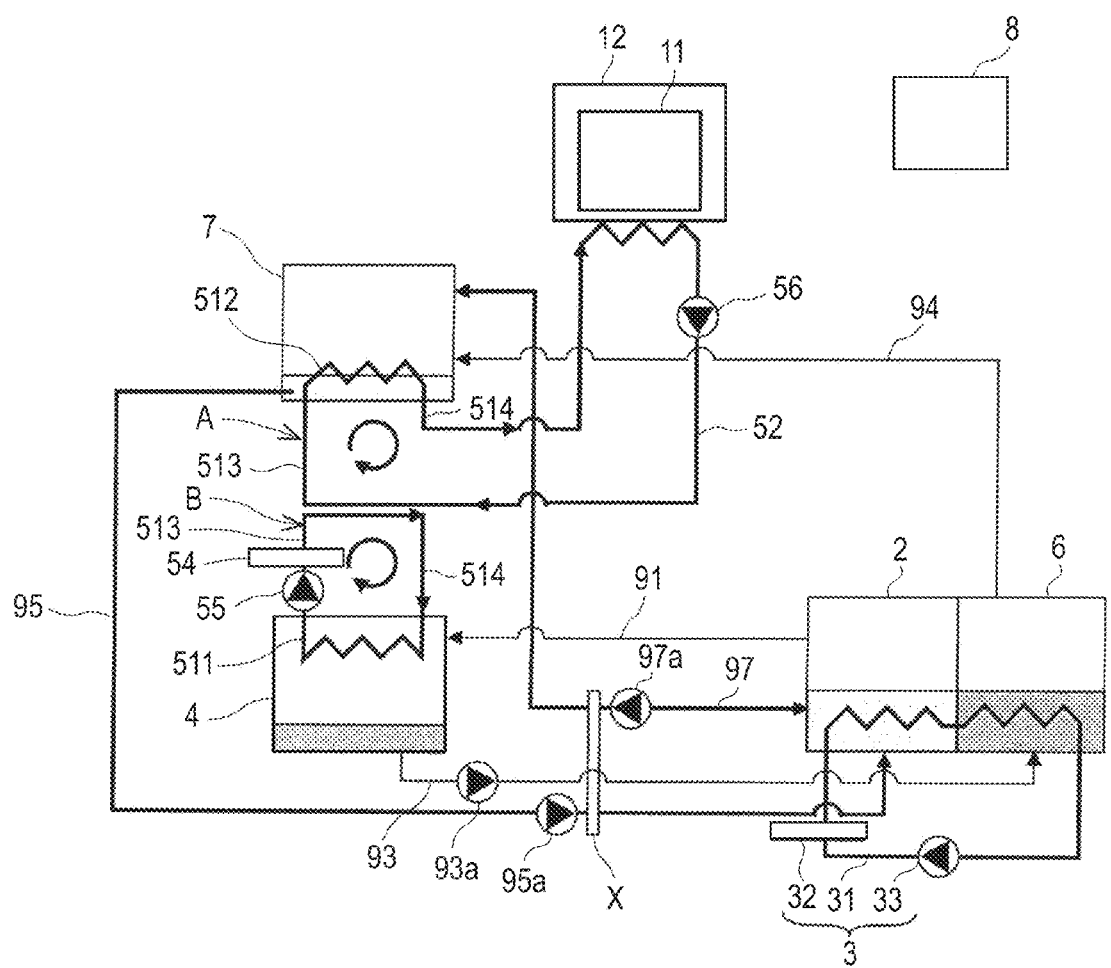
FIG. 3 is a conceptual view for explaining a heating operation of the absorption type heat pump device of the embodiment.

Meanwhile, as shown in FIG. 3, in the heating operation, the controller 8 controls the flow path change valves 521, 522, 513a, and 514a, and configures the refrigerant flow path of the heat exchanger 5 with the flow path A and the flow path B. Accordingly, heat exchange between the absorber 7 and the battery case 12 is performed. In addition, in the heating operation, the controller 8 drives the electric pump 93a and supplies the water to the evaporator 6 from the condenser 4. Accordingly, the vapor evaporated in the evaporator 6 is supplied to the absorber 7 from the evaporator 6. In addition, in the heating operation, the absorbing solution having relatively high concentration accommodated in the regenerator 2 is supplied to the absorber 7 through the seventh flow path 97.

In both cooling operation and the cooling operation, the controller 8 suitably drives the electric pumps 33, 95a, and 97a. In addition, a common heat exchange member X is provided on the fifth flow path 95 and the seventh flow path 97, and heat exchange between liquid which flow through the flow paths 95 and 97 is performed. Further, for ease of vaporization or circulation of gas and liquid, the atmosphere pressure (for example, 1 kPa) in the battery case 12, the evaporator 6, and the absorber 7 is set to be lower than the atmosphere pressure (for example, 10 kPa) in the regenerator 2 and the condenser 4.

Cooling Operation

The overview of the cooling operation will be described with reference to FIG. 2. At the time of the cooling operation, the water (refrigerant) is supplied to the battery case 12 from the condenser 4. The water is evaporated by the negative pressure generated in the absorber 7 and the heat of the battery 11, and the battery 11 is cooled using the vaporized heat. The vapor generated in the battery case 12 is supplied to the absorber 7. In the absorber 7, heat is generated by the reaction of the vapor from the battery case 12 and the absorbing solution, and the absorbing solution which is diluted by the reaction is supplied to the regenerator 2. In the regenerator 2, the absorbing solution is heated, and the vapor and the absorbing solution concentrated by reducing a water component are obtained. The vapor is supplied to the condenser 4 and the absorbing solution with high concentration is supplied to the absorber 7. In the condenser 4, the vapor is condensed to generate water, and the water is supplied to the battery case 12. The absorber 7 and the condenser 4 are subjected to heat exchange with the outside by the heat exchanger 5 (annular flow path 51) to be cooled.

In the embodiment, at the time of the cooling operation, the water (condensed solution) is not supplied to the evaporator 6, and the evaporator 6 is in an idle state. A valve (not shown) of the third flow path 93 is closed. At the time of the cooling operation, the inside of the evaporator 6 is in an empty state of the water (refrigerant).

Heating Operation

The overview of the heating operation will be described with reference to FIG. 3. At the time of heating operation, the water is supplied to the evaporator 6 other than the battery case 12 from the condenser 4. That is, the electric pump 92a is stopped and the electric pump 93a is driven. A valve (not shown) of the second flow path 92 is closed, and the inside of the battery case 12 is in an empty state of the water.

The water supplied to the evaporator 6 is evaporated by the heat source 3, and the vapor (for example, equal to or more than 50° C.) is supplied to the absorber 7 from the evaporator 6. In addition, by being heated by the heat source 3, the absorbing solution (for example, equal to or more than 50° C.) with relatively high concentration is supplied to the absorber 7 from the regenerator 2. In the absorber 7, the heat (for example, equal to or more than 85° C.) is generated with the reaction of the vapor and the absorbing solution with high concentration. Heat exchange between the absorber 7 and the battery case 12 is performed by the flow path A. That is, the reaction heat in the absorber 7 is transferred to the battery case 12 through the flow path A, the battery 11 is heated, and the absorber 7 is cooled.

The diluted absorbing solution obtained in the absorber 7 is supplied to the regenerator 2. In the regenerator 2, in the same manner as the time of the cooling operation, the absorbing solution is heated by the heat source 3, the vapor is supplied to the condenser 4, and the concentrated absorbing solution is supplied to the absorber 7. The condenser 4 is subjected to heat exchange with the outside by the flow path B, and is cooled.

Effects

As described above, at the time of the cooling operation, the absorption type heat pump device of the embodiment causes the battery case 12 to function as the evaporator, causes the battery 11 to function as the heat source of the evaporator, and use the circulation action of the absorption type heat pump, and thus, it is possible to continuously cool the battery 11. Further, in the embodiment, it is possible to switch the cooling operation and the heating operation, and in the heating operation, the battery 11 is heated using the reaction heat in the absorber 7. Since it is possible to generate the reaction heat of the absorber 7 by supplying the vapor (or water) and the absorbing solution with relatively high-temperature concentration to the absorber 7, it is possible to rapidly heat the battery 11 regardless of the state of the heat source 3.

In addition, in the heating operation, by performing heat exchange of the absorber 7 and the battery case 12, and using the circulation action of the absorption type heat pump, it is possible to continuously heat the battery 11. In addition, in the heating operation, since the reaction heat depends on difference between the concentration of the absorbing solution which flows out from the absorber 7 and the concentration of the absorbing solution which is supplied to the absorber 7, even in a case where the energy is stored by the concentration difference and the heat source 3 is changed (change in a temperature or an amount of heat of the exhaust heat), it is possible to suppress the fluctuation of cold-heat to be generated. That is, it is possible to suitably control the temperature of the battery 11 regardless of the state of the heat source 3. In addition, since the capacity of the heat source 3 is sufficient for heating the regenerator 3 and concentrating the absorbing solution, it is possible to use exhaust heat with a relatively low temperature (for example, 50° C.). By controlling a flow rate of the absorbing solution, it is possible to suitably use even the exhaust heat with a high temperature (for example, equal to or higher than 1000° C.).

In addition, in the embodiment, in the heating operation, since, even when the temperature of the heat source 3 is low, it is possible to obtain the reaction heat with a high temperature in the absorber 7, it is possible to increase the difference in temperature with the battery 11. Accordingly, it is possible to reduce the size of the heat exchange member used for heat exchange between the battery case 12 and the absorber 7. According to the embodiment, a heat exchange promoter such as a fin does not need to be provided, and thus, it is possible to reduce the size of the entire device and reduce the manufacturing cost.

In addition, in the heat exchanger 5, the second inner flow path 512 is commonly used in the annular flow path 51 and the flow path A. In addition, the heat exchanger 5 is commonly used for the condenser 4 and the absorber 7. Further, by controlling the flow path change valves 521, 522, 513a, and 514a, it is possible to change the annular flow path 51 to the flow path A and the flow path B. According to the configurations, the common flow paths are configured, it is possible to efficiently use the flow paths, and it is possible to save spaces.

In addition, in the embodiment, since a sorbent is not used, it is not necessary to separately provide a device which cools the sorbent, and thus, it is possible to have a configuration with a simple structure.

Modified Embodiment

Figure 4:
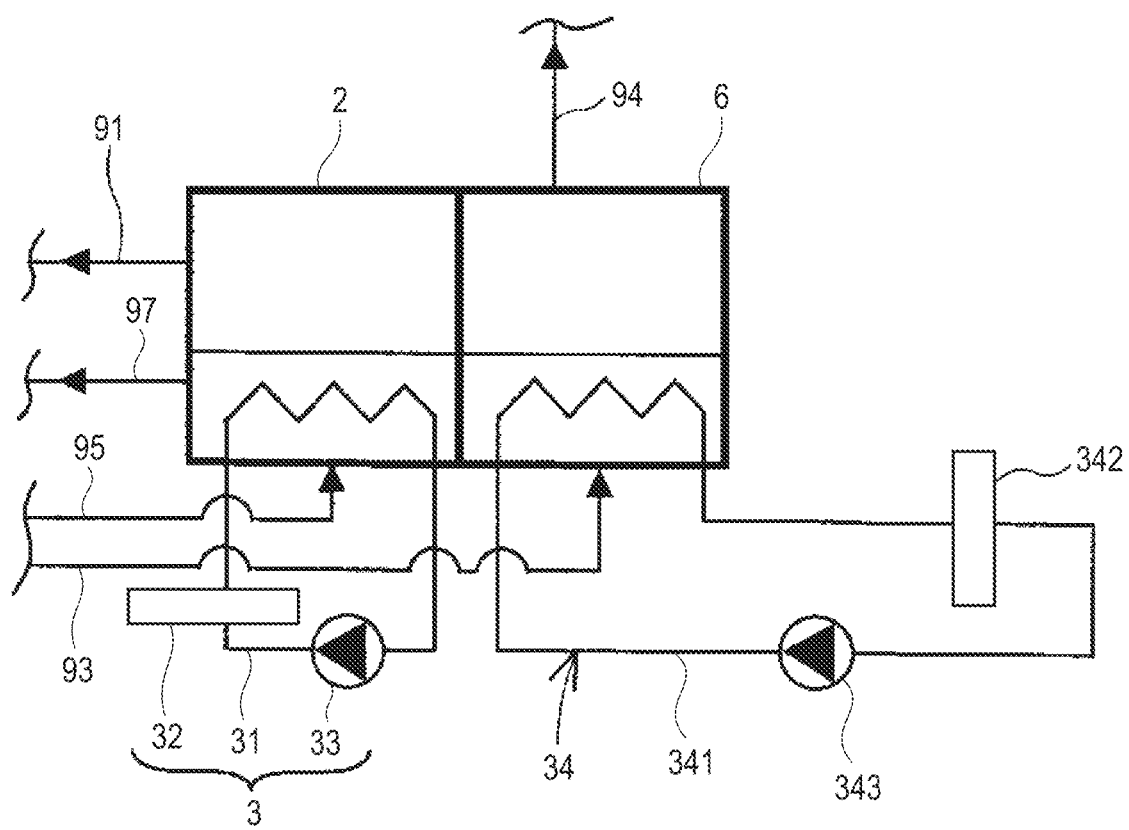
FIG. 4 is a conceptual view showing a modified embodiment of the embodiment.

The disclosure is not limited to the embodiment described above. As shown in FIG. 4, for example, a separate heat exchanger from the regenerator 2 may be provided on the evaporator 6. That is, a heat exchanger (which corresponds to a "third heat exchanger") 34 which performs heat exchange of the inside and the outside of the evaporator 6 is provided on the evaporator 6. The heat exchanger 34 includes a flow path 341 through which a heat medium flows, an electric pump 342, and a heat exchange member 343.

At the time of cooling operation, the controller 8 causes the third flow path 93 to be passed through, and suitably drives the electric pump 93a, and a part of the condensed solution (water) flows into the evaporator 6 from the condenser 4. That is, in this case, at the time of the cooling operation, the water is supplied to the battery case 12 and the evaporator 6 from the condenser 4. The heat medium which flows through the flow path 341 heats and evaporates the water, and is cooled. The cooled heat medium is heated by the heat exchange member 343, and cools the periphery of the heat exchange member 343. That is, by using the evaporator 6 and the heat exchanger 34, the absorption type heat pump device of the embodiment can also function as a cooler (air conditioner).

Figure 5:
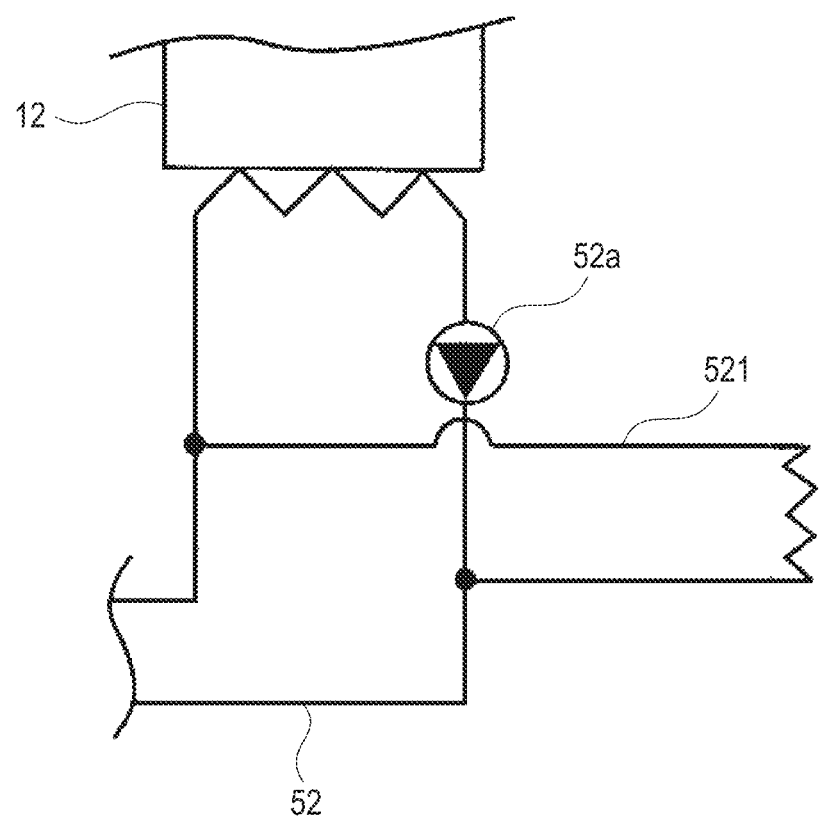
FIG. 5 is a conceptual view showing a modified embodiment of the embodiment.

In addition, it is also possible to form a new branched flow path, or to fix another heating target, with respect to the first branched flow path 52 through which the refrigerant flows at the time of heating operation. As shown in FIG. 5, for example, in a case of providing a branched flow path 521 with respect to the first branched flow path 52, it is possible to flow the refrigerant which is warmed in the absorber 7 also into the branched flow path 521. For example, the branched flow path 521 can be extended to the heat of the vehicle, and can function as a heat heater. As described above, by providing heat of the branched flow path 521 to a location which is desired to be heated, it is possible to rapidly heat the target, even in a case of a low temperature of the heat source 3 such as immediately after starting moving of a vehicle, for example.

The flow path change valves 521, 522, 513a, and 514a are only necessary to change the flow paths by opening and closing of the valves. For example, the flow path change valves 521 and 513a may be provided on the first external flow path 513 as one valve. In the same manner, the flow path change valves 522 and 514a may be provided on the second external flow path 514 as one valve. For example, only the flow path change valves 513a and 514a may be provided, and by controlling the flow path change valves 513a and 514a, a configuration may be provided so as to switch the flow path at the time of the cooling operation and the flow path at the time of the heating operation. In addition, each of the flow path change valves 521, 522, 513a, and 514a may be a plurality of valves.

Figure 6:
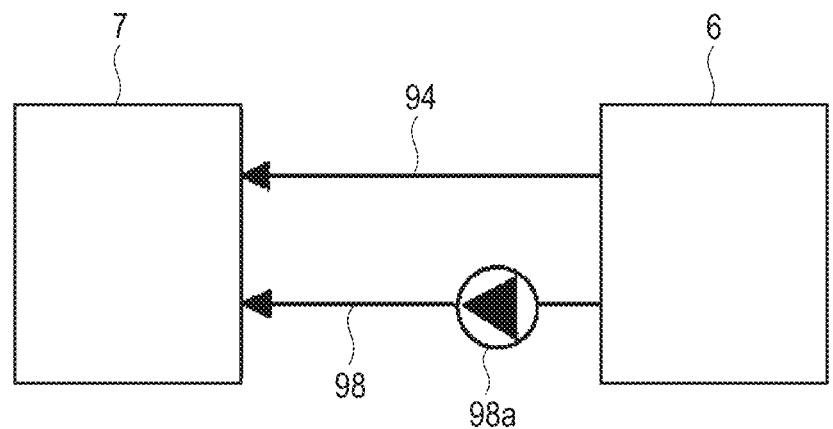
FIG. 6 is a conceptual view showing a modified embodiment of the embodiment.

In addition, at the time of heating operation (see FIG. 3), the supplying of the refrigerant from the evaporator 6 to the absorber 7 may be set as supplying of the refrigerant having a liquid phase (water), without limiting to a gas phase (vapor). As shown in FIG. 6, an eighth flow path 98 and an electric pump 98a may be formed between the evaporator 6 and the absorber 7, and the refrigerant having a liquid phase may be configured so as to be supplied from the evaporator 6 to the absorber 7 through the eighth flow path 98. In this case, the water is supplied to the absorber 7, the water and the absorbing solution are reacted in the absorber 7, and the same action effects as the embodiment described above are generated. According to the configuration, it is possible to generate the reaction heat in the absorber 7, without waiting for the evaporation of the refrigerant in the evaporator 6. That is, even in a low temperature state of the heat source 3, such as at the start of moving a vehicle, it is possible to further rapidly heat the battery 11. In addition, the eighth flow path 98 and the fourth flow path 94 may be configured to be one common flow path. In addition, it is only necessary to supply at least one of the diluent (refrigerant) having a gas phase and the diluent (refrigerant) having a liquid phase to the absorber 7 from the evaporator 6.

The absorption type heat pump device of the embodiment is preferable to be applied to a hybrid vehicle (HV) or an electrical vehicle (EV) mounting the battery. According to this, it is possible to suitably execute continuous cooling of the battery 11 and heating of the battery 11 at the start of moving a vehicle in cold time. As the heat source 3, heat of the exhaust gas or motor can be used.

In addition, in the embodiment, the heat exchanger 5 is commonly used for the condenser 4 and the absorber 7, however, separated heat exchanger may be provided for each of them. In addition, the absorbing solution which is previously concentrated may be accommodated in the regenerator 2. Accordingly, even at the time of initial operation of the absorption type heat pump device, it is possible to generate difference in concentration between the absorbing solution which flows out from the absorber 7 and the absorbing solution which flows out from the regenerator 2, and it is possible to further rapidly heat the battery 11. In addition, after operating the absorption type heat pump device once, the difference in concentration described above is generated in the absorbing solutions when starting moving a vehicle, next time.

In addition, as the heat exchange member, a radiator or the like is used. A part of the first branched flow path 52 may be disposed in the battery case 12. In addition, the flow path where heat exchange is performed, may not be disposed in the device to be a target, and for example, may have a configuration to be fixed to an external wall of the device so that heat exchange with the inside of the device is performed. Further, the gas or liquid may flow by difference in height or atmosphere pressure, without using the electric pumps. A configuration not shown in FIGS. 4 to 6 is the same configuration as the embodiment.

Therefore, aspects of this disclosure are further described below.

The disclosure disclosed in a first aspect is an absorption type heat pump device including: a battery; a battery case which accommodates the battery; a regenerator which separates a refrigerant having a gas phase from an absorbing solution heated by a heat source to relatively increase concentration of the absorbing solution; a condenser which condenses the refrigerant having a gas phase obtained in the regenerator to obtain the solvent having a liquid phase, by performing heat exchange with the outside; an evaporator which evaporates the refrigerant having a liquid phase obtained in the condenser to obtain the refrigerant having a gas phase, by performing heat exchange with the outside; an absorber which causes the absorbing solution to absorb the refrigerant to obtain the relatively diluted absorbing solution, and supplies the diluted absorbing solution to the regenerator, by performing heat exchange with the outside or the battery case and bringing the absorbing solution having a liquid phase obtained in the regenerator in contact with the refrigerant having a gas phase; and a controller which switches a cooling operation for cooling the battery and a heating operation for heating the battery, in which, in the cooling operation, heat exchange between the absorber and the outside of the absorber is performed, the refrigerant having a liquid phase is supplied to the battery case from the condenser, and the refrigerant having a gas phase which is obtained by evaporating the refrigerant having a liquid phase by the heat of the battery, is supplied to the absorber, and in the heating operation, heat exchange between the absorber and the battery case is performed, the refrigerant having a gas phase or a liquid phase is supplied to the absorber from the evaporator, and the absorbing solution with relatively high concentration which is accommodated in the regenerator is supplied to the absorber.

According to the disclosure disclosed in the first aspect, at the time of the cooling operation, the battery case functions as the evaporator, and the battery functions as a heat source of the evaporator to use a circulation action of an absorption type heat pump, and thus, it is possible to continuously cool the battery. In addition, according to the disclosure, it is possible to switch the cooling operation and the heating operation, and in the heating operation, it is possible to heat the battery using reaction heat in the absorber. Also, in the heating operation, the absorber and the battery case are subjected to heat exchange, and the circulation action of the absorption heat pump is used, and thus, it is possible to continuously heat the battery. In addition, since heat generation of the absorber is generated by supplying condensation of the refrigerant (diluent) having a gas phase and the absorbing solution having relatively high-temperature concentration to the absorber, it is possible to heat the battery regardless of a state of the heat source.

In the disclosure, it is possible to configure the absorption type heat pump device with the simple structure, without using the sorbent, and without necessity of separately providing a device which cools the sorbent. As described above, according to the disclosure, it is possible to realize simplification of a configuration, to continuously cool a battery, and to heat a battery.

In the disclosure disclosed in a second aspect according to the first aspect, a first heat exchanger into which a heat medium flows, is disposed with respect to the absorber, the first heat exchanger includes a common flow path, at least a part of which performs heat exchange of the absorber and the heat medium, a cooling flow path which is connected to the common flow path and performs heat exchange of the outside of the absorber and the heat medium, and a heating flow path which is connected to the common flow path and performs heat exchange of the battery case and the heat medium, and the controller configures the first heat exchanger with the common flow path and the cooling flow path in the cooling operation, and configures the first heat exchanger with the common flow path and the heating flow path in the heating operation.

According to the disclosure disclosed in the second aspect, since the flow path which is common for the cooling operation and the heating operation is used as a flow path configured by the heat exchanger, it is possible to realize simplification of a configuration and to save spaces.

In the disclosure disclosed in a third aspect according to the second aspect, a second heat exchanger into which the heat medium flows, is disposed with respect to the condenser, and the controller forms one annular flow path by the first heat exchanger and the second heat exchanger in the cooling operation, and forms one separated annular flow path for each of the first heat exchanger and the second exchanger in the heating operation.

In addition, according to the disclosure disclosed in the third aspect, one common flow path is configured by the first heat exchanger and the second heat exchanger, and it is possible to further realize simplification of a configuration and to save spaces.

In the disclosure disclosed in a fourth aspect according to any one of the first to third aspects, a third heat exchanger for performing heat exchange of inside and outside of the evaporator is further included, and a part of the refrigerant having a liquid phase is supplied to the evaporator from the condenser, at the time of the cooling operation.

According to the disclosure disclosed in the fourth aspect, the third heat exchanger can function as a device (for example, a cooler) which cools a predetermined location of the outside of the evaporator, using heat exchange between the evaporator and the outside.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An absorption type heat pump device comprising:
   a battery;
   a battery case which accommodates the battery;
   a regenerator which separates a refrigerant having a gas phase from an absorbing solution heated by a heat source to relatively increase concentration of the absorbing solution;
   a condenser which condenses the refrigerant having a gas phase obtained in the regenerator to obtain the solvent having a liquid phase, by performing heat exchange with the outside;
   an evaporator which evaporates the refrigerant having a liquid phase obtained in the condenser to obtain the refrigerant having a gas phase, by performing heat exchange with the outside;
   an absorber which causes the absorbing solution to absorb the refrigerant to obtain the relatively diluted absorbing solution, and supplies the diluted absorbing solution to the regenerator, by performing heat exchange with the outside or the battery case and bringing the absorbing solution having a liquid phase obtained in the regenerator in contact with the refrigerant having a gas phase; and
   a controller which switches a cooling operation for cooling the battery and a heating operation for heating the battery,
   wherein, in the cooling operation, heat exchange between the absorber and the outside of the absorber is performed, the refrigerant having a liquid phase is supplied to the battery case from the condenser, and the refrigerant having a gas phase which is obtained by evaporating the refrigerant having a liquid phase by the heat of the battery, is supplied to the absorber,
   in the heating operation, heat exchange between the absorber and the battery case is performed, the refrigerant having a gas phase or a liquid phase is supplied to the absorber from the evaporator, the regenerator and the evaporator are both heated by an external heat source, and the absorbing solution with relatively high concentration which is accommodated in the regenerator is supplied to the absorber, and
   heat exchange between the absorber and the battery case can be continuously performed, wherein the heat generated when the absorbing solution from the regenerator absorbs the refrigerant gas from the evaporator is used in the heat exchange.

2. The absorption type heat pump device according to claim 1,
   wherein a first heat exchanger into which a heat medium flows, is disposed with respect to the absorber,
   the first heat exchanger includes a common flow path, at least a part of which performs heat exchange of the absorber and the heat medium, a cooling flow path which is connected to the common flow path and performs heat exchange of the outside of the absorber and the heat medium, and a heating flow path which is connected to the common flow path and performs heat exchange of the battery case and the heat medium, and
   the controller configures the first heat exchanger with the common flow path and the cooling flow path in the cooling operation, and configures the first heat exchanger with the common flow path and the heating flow path in the heating operation.

3. The absorption type heat pump device according to claim 2,
   wherein a second heat exchanger into which the heat medium flows, is disposed with respect to the condenser, and
   the controller forms one annular flow path by the first heat exchanger and the second heat exchanger in the cooling operation, and forms one separated annular flow path for each of the first heat exchanger and the second exchanger in the heating operation.

4. The absorption type heat pump device according to claim 1,
   wherein a third heat exchanger for performing heat exchange of the inside and the outside of the evaporator, is disposed, and
   a part of the refrigerant having a liquid phase is supplied to the evaporator from the condenser, at the time of the cooling operation.

5. The absorption type heat pump device according to claim 2,
   wherein a third heat exchanger for performing heat exchange of the inside and the outside of the evaporator, is disposed, and
   a part of the refrigerant having a liquid phase is supplied to the evaporator from the condenser, at the time of the cooling operation.

6. The absorption type heat pump device according to claim 3,
   wherein a third heat exchanger for performing heat exchange of the inside and the outside of the evaporator, is disposed, and
   a part of the refrigerant having a liquid phase is supplied to the evaporator from the condenser, at the time of the cooling operation.

* * * * *